US008630286B2

(12) United States Patent
Matthews

(10) Patent No.: US 8,630,286 B2
(45) Date of Patent: Jan. 14, 2014

(54) SYSTEM AND METHOD FOR IMPROVING MULTICAST PERFORMANCE IN BANKED SHARED MEMORY ARCHITECTURES

(75) Inventor: Brad Matthews, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 162 days.

(21) Appl. No.: 13/366,292

(22) Filed: Feb. 4, 2012

(65) Prior Publication Data

US 2013/0083796 A1 Apr. 4, 2013

Related U.S. Application Data

(60) Provisional application No. 61/541,612, filed on Sep. 30, 2011.

(51) Int. Cl.
*H04L 12/50* (2006.01)
(52) U.S. Cl.
USPC .......................................... 370/360; 370/386
(58) Field of Classification Search
USPC ................... 370/360–383, 386–390
See application file for complete search history.

(56) References Cited

U.S. PATENT DOCUMENTS

| 6,788,684 | B2 * | 9/2004 | Makishima et al. | 370/390 |
|---|---|---|---|---|
| 8,385,148 | B2 * | 2/2013 | Kwan et al. | 365/226 |
| 8,533,388 | B2 * | 9/2013 | Matthews | 711/105 |
| 2007/0195761 | A1 * | 8/2007 | Tatar et al. | 370/389 |
| 2007/0268901 | A1 * | 11/2007 | Narvaez | 370/390 |
| 2010/0318821 | A1 * | 12/2010 | Kwan et al. | 713/320 |
| 2012/0185633 | A1 * | 7/2012 | Sano | 710/316 |

FOREIGN PATENT DOCUMENTS

EP 0948169 A2 10/1999

OTHER PUBLICATIONS

Yamanaka et al., "Scalable Shared-Buffering ATM Switch with a Versatile Searchable Queue," IEEE Journal on Selected Areas in Communications, vol. 15, No. 5, Jun. 1997.
EP Search Report, Feb. 19, 2013.

* cited by examiner

*Primary Examiner* — Hong Cho
(74) *Attorney, Agent, or Firm* — Duane S. Kobayashi

(57) ABSTRACT

A system and method for improving multicast performance in banked shared memory architectures. Temporal localities created by multicast packets in a shared memory bank are addressed through caching. In one embodiment, multicast packets are stored in a cache memory that is associated with a bank of shared memory. In another embodiment, read requests for multicast packets are stored in a read request cache, wherein additional read requests are accumulated prior to an actual read event.

9 Claims, 3 Drawing Sheets

SYSTEM AND METHOD FOR IMPROVING MULTICAST PERFORMANCE IN BANKED SHARED MEMORY ARCHITECTURES

This application claims priority to provisional patent application Ser. No. 61/541,612, filed Sep. 30, 2011, which is incorporated by reference herein, in its entirety, for all purposes.

BACKGROUND

1. Field of the Invention

The present invention relates generally to network switches and, more particularly, to a system and method for improving multicast performance in banked shared memory architectures.

2. Introduction

Increasing demands are being placed upon the data communications infrastructure. These increasing demands are driven by various factors, including the increasing bandwidth requirements of Internet multimedia applications (e.g., distribution of news, financial data, software, video, audio and multi-person conferencing, etc). To accommodate the increasing bandwidth requirements, communication link speeds have also continued to evolve. For example, 10 Gigabit Ethernet (GbE) ports are commonly used for I/O on many of today's network switches.

Shared memory is commonly used to build output queued (OQ) switches. An OQ switch is known to maximize throughput, minimize delay and can offer quality of service (QoS) guarantees. Shared memory switches are not believed to scale well to high-capacity switches, however, because the requirements on the memory size, memory bandwidth and memory access time increase linearly with the line rate R and the number of ports N. For example, an N-port switch would need to operate N times faster than the line rate to achieve full throughput.

Consider, for example, a 128×10 Gbps switch. Here, a packet arrival rate using 10 Gbps for 64 bytes along with a 20 byte interpacket gap (IPG) is approximately 67 ns. The memory would therefore be required to perform a read and write in approximately 67 ns. For a 128 port 10 Gbps switch, the memory would be required to support all reads and writes in the time required to receive a single 65 byte packet. Thus, an access time of 67 ns/(128 reads+128 writes)=approximately 250 ps. As would be appreciated, a 250 ps access time is not practical for the technology of today's switches.

For this reason, development of high-capacity switches is moving towards banks of memories for scalability. With multiple banks of shared memories, bandwidth requirements can be evenly distributed across multiple memories, thereby increasing the memory access time required. For example, the average memory bandwidth required for unicast traffic is reduced by 1/m, where m is the number of memories.

While multiple memories are known to enhance scalability for unicast traffic, multicast traffic can present its own challenges. For example, where all packets for a given multicast frame are located in the same memory, a high degree of temporal locality at that memory can result because multiple reads to that same memory may occur at or around the same timeframe. What is needed therefore is a mechanism that improves multicast performance in banked shared memory architectures.

SUMMARY

A system and/or method for improving multicast performance in banked shared memory architectures, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
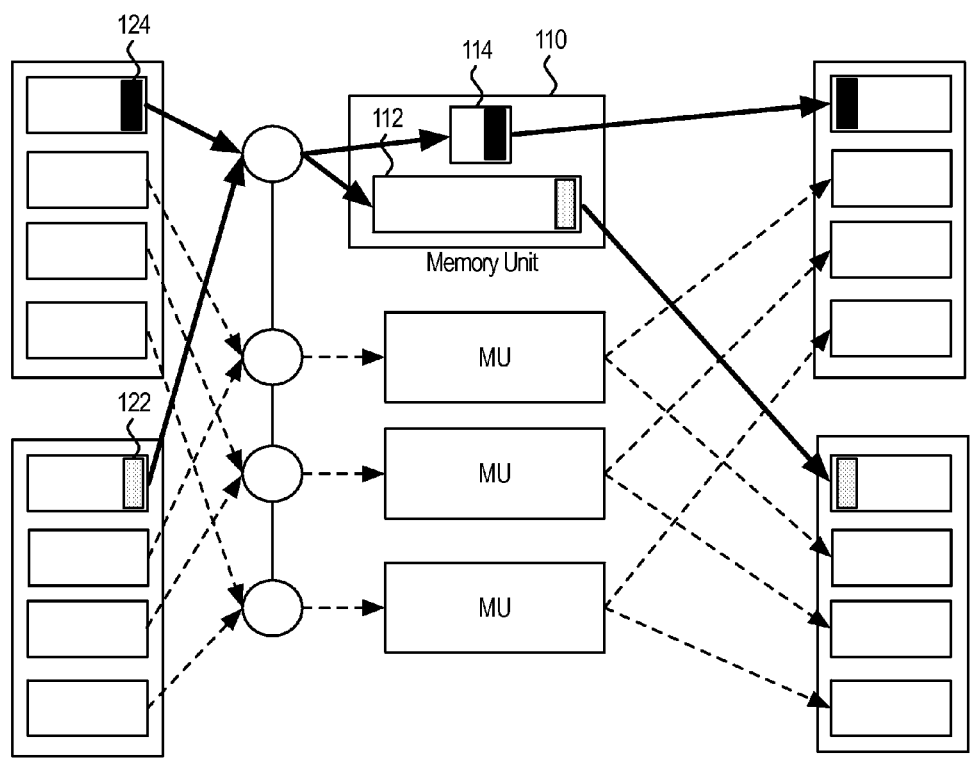
FIG. 1 illustrates an example embodiment of data caching in a switch having a set of shared memories in parallel.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Multicast traffic has become increasingly important as the consumption of multimedia traffic has increased at a rapid rate. In transmitting a single stream of data efficiently to multiple destinations, multicast provides an effective mechanism for conserving network bandwidth. To support the continued proliferation of multimedia applications, the underlying infrastructure must correspondingly improve in its performance to meet certain QoS guarantees. Here, the underlying infrastructure must meet performance requirements such as low latency, minimal jitter, fairness, etc.

As noted above, one solution to solving the memory bandwidth constraint for a single shared memory switch is to employ a set of shared memories in parallel. One example of such an approach is a parallel shared memory switch, in which all of the shared memory resources are located in a central location. Another example of such an approach is a distributed shared memory switch, in which the memories are distributed among the line cards. Logically, the distributed shared memory switch is equivalent to a parallel shared memory switch.

As would be appreciated, memory management algorithms can be used to identify a particular number of memory units needed in a given implementation. What is significant in this regard, however, is that the particular number of memory units identified for a particular switch is based primarily on unicast traffic models.

Multicast traffic, on the other hand, presents different challenges. In routing multicast traffic to a plurality of output ports, multiple approaches can be taken in a shared memory switch. In one approach, a multicast packet may be duplicated before the shared memory. This approach would place greater demands on the memory, however, as multiple copies are maintained in the memory. This reduces the effective throughput of the shared memory switch.

In another approach, a multicast packet may be read multiple times from the same memory location, wherein the control circuitry keeps the multicast packet in memory until it has been read for distribution to all the output ports in the multicast group. This approach can also lead to inefficiencies as the existence of a multicast packet in a particular bank of shared memory will introduce a high degree of temporal locality for that particular bank of shared memory. This temporal locality will lead to a bottleneck in that bank of shared memory as the bank of shared memory is restricted to one read per time slot.

For example, if a memory management module transfers a multicast packet to a memory unit and the multicast packet is to be delivered to each of the output ports 1-N, then N reads of the same multicast packet would need to occur in N time slots since only one read occurs per time slot. This would effectively reduce the throughput of the memory unit as reads for other unicast packets in the memory unit may be delayed. A compromise in the line rate can therefore occur.

In the present invention it is recognized that the temporal locality produced in the banks of shared memory by the multicast traffic can be exploited to address the line rate issue. It is therefore a feature of the present invention that the temporal locality is exploited through the use of caching to assist in the reading of multicast traffic stored in a bank of shared memory.

FIG. 1 illustrates an example embodiment of data caching in a switch having a set of shared memory units in parallel. As illustrated memory unit 110 includes main memory 112 as well as smaller cache memory 114. As will be described in greater detail below, cache memory 114 is designed to store multicast packets. In one embodiment, cache memory 114 can be included in each bank of shared memory. In another embodiment, a cache memory can be associated with a group of banks of shared memory.

When traffic enters the switch, packet processing units execute real-time operations on packets, such as framing/parsing, classification, traffic policing and shaping, modification, compression/encryption, queueing, etc. As part of this process, packet processing units can separate unicast and multicast traffic and place those packets in separate queues. Here, it should be noted that reads or writes can occur on packet boundaries or segment (of packet) boundaries.

To illustrate the relative processing of unicast and multicast types of traffic, a single multicast packet is identified as packet 122, while a single unicast packet is identified as packet 124. As illustrated, unicast packet 122 is routed to memory unit 110. Selection of a particular one of the banks of memory units is based on a particular memory management algorithm that is implemented. At memory unit 110, unicast packet 122 is stored in main memory 112.

In contrast, when multicast packet 124 is routed to memory unit 110 by the memory management algorithm, it is written first to main memory, then subsequently written to multicast cache memory 114 when the multicast packet is read from main memory. This is due to the temporal locality created by the multicast packet. Here, it should be noted that a check is first performed to determine whether cache memory 114 has room to store multicast packet 124. This check is needed because cache memory 114 is not sized by design to guarantee storage of every multicast packet. While the number of memory units in the switch can be predetermined in accordance with an implemented memory management algorithm designed to handle the storage of incoming unicast packets arriving at a given line rate, the size of the multicast memory cannot be so definitive as the percentage of multicast traffic to unicast traffic is not known a priori. Moreover, a given multicast cache memory can also be associated with a group of memory units, rather than a single memory unit to provide significantly improved performance for multicast traffic with little additional expense.

The storage of multicast packet 124 in cache memory 114 exploits the high degree of temporal locality created by multicast packet 114. As would be appreciated, once multicast packet 124 is stored in memory unit 110, multiple reads of memory unit 110 are to be expected for multicast packet 124. In accordance with the present invention, the storage of multicast packet 124 in cache memory 114 enables two reads to occur from memory unit 110 in the time slots during which a multicast packet is resident in cache memory 114. Specifically, in a given time slot, unicast packet 122 can be read from main memory 112 and multicast packet 124 can be read from cache memory 114. In subsequent time slots, further reads of the same multicast packet 124 can occur from cache memory while not inhibiting the reading of unicast packets from main memory 112.

Figure 2:
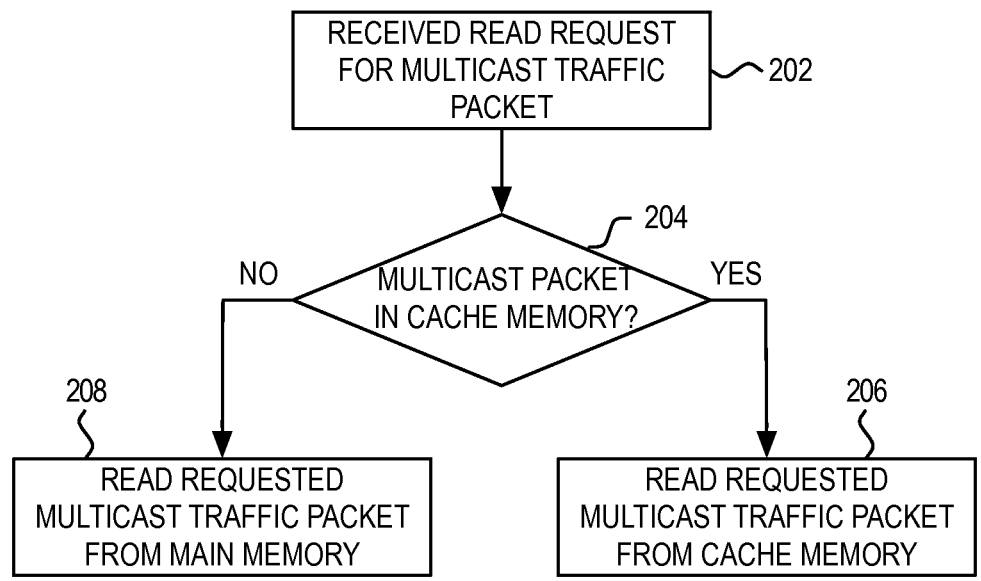
FIG. 2 illustrates a flowchart of a process of the present invention.

To further illustrate the use of cache memory 114 in handling multicast traffic, reference is now made to the flowchart of FIG. 2. As illustrated the process of reading multicast traffic from a memory unit begins at step 202 where a read request for multicast traffic is received. At step 204, the multicast packet read request is then evaluated to determine whether the multicast packet is stored in the cache memory. If it is determined at step 204 that the multicast packet is stored in the cache memory, then the multicast packet is read from the cache at step 206. Alternatively, if it is determined at step 204 that the multicast packet is not stored in the cache memory, then the multicast packet is read from the main memory at step 208.

As would be appreciated, the inclusion of a small cache memory 114 is designed to address the handling of multicast traffic in a switch in an efficient manner. In the present invention, the small cache memory 114 is small relative to the main memory and can be sized based on particular performance goals. Here, it should be noted that the inclusion of small cache memory 114 is not akin to creating additional banks of shared memories. Simply adding additional banks of shared memories would lead to inefficiencies as the number of banks of shared memories are often chosen in accordance with the design of the memory management algorithm to emulate a first-come-first-served OQ switch. Adding small multicast cache memories is therefore efficient in providing a marginal increase in memory unit size, wherein such a marginal increase provides a large increase in switch memory throughput in effectively addressing temporal localities created by multicast traffic.

The use of caching to address temporal localities need not be limited to the data caching example described above. In one embodiment, caching can be applied to read requests for multicast traffic rather than to the multicast data itself Here, each multicast read request would be stored in a multicast read request cache. Requests to the same bank of shared memory that occur prior to an actual read event from a bank of shared memory would then be counted. In other words, the additional multicast read requests would be accumulated prior to an actual read event. As would be appreciated, the accumulation of the multicast read requests would also include a passage of control information such as the destination port(s) of the additional multicast read requests.

When an actual read of the multicast packet from a bank of shared memory occurs, the multicast packet would be read once. The read multicast packet would then be passed along with the control information that specifies the destination port(s), at which time, the multicast packet would be duplicated and transferred to the multiple destination ports whose multicast packet read requests were accumulated.

Figure 3:
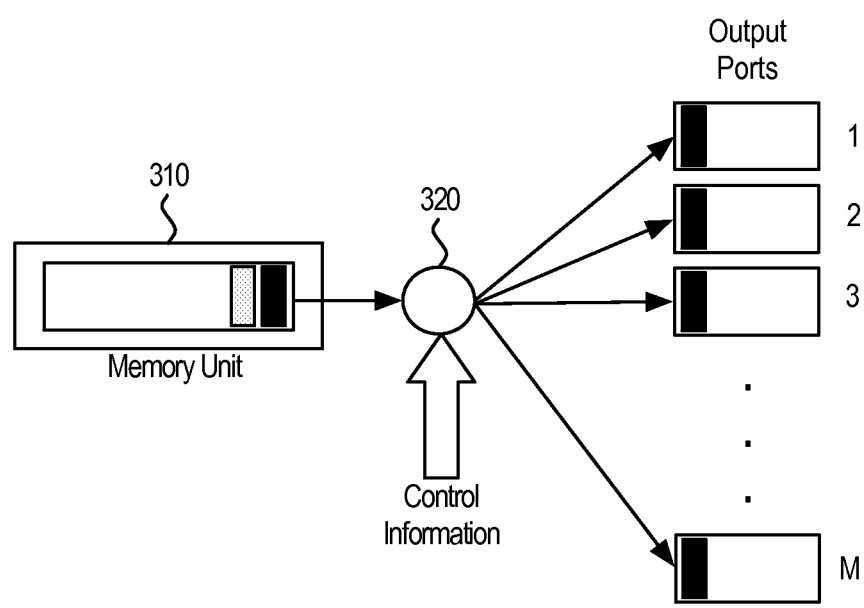
FIG. 3 illustrates an example embodiment of read request caching for multicast traffic.

FIG. 3 illustrates a generic control structure for multicast packets using read request caching. As illustrated, a multicast packet is read from memory unit 310 in a single read event. This packet is passed to control element 320 that also receives control information (e.g., count and destination port(s)) to thereby transfer the multicast packet to a plurality of identified destination ports.

Here, it should be noted that the accumulated number of multicast read requests may represent less than the total number of multicast read requests for that particular multicast packet. In fact, multiple actual reads of a particular multicast packet in a bank of shared memory may still occur. What is significant, however, is that each actual read of a multicast packet from a bank of shared memory can be representative of a plurality of read requests. The read request caching therefore addresses the temporal locality by reducing the number of actual reads made to that particular bank of shared memory. This reduction effectively increases the throughput of the shared memory switch.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A switch, comprising:
    a plurality of ingress ports, said plurality of ingress ports receiving traffic from a corresponding first plurality of network devices that are coupled to said plurality of ingress ports via a respective first plurality of network communication cables;
    a plurality of egress ports, said plurality of egress ports transmitting traffic to a corresponding second plurality of network devices that are coupled to said plurality of egress ports via a respective second plurality of network communication cables; and
    a plurality of shared memory banks that couple said plurality of ingress ports to said plurality of egress ports, each of said plurality of shared memory banks having a main memory, wherein cache memory associated with a first of said plurality of shared memory banks is used to store multicast traffic, thereby enabling a read of unicast traffic stored in a main memory of said first of said plurality of shared memory banks in parallel with a read of multicast traffic stored in said cache memory associated with said first of said plurality of shared memory banks.

2. The switch of claim 1, wherein each of said plurality of shared memory banks have a cache memory for storage of multicast traffic.

3. The switch of claim 1, wherein said cache memory is associated with a group of shared memory banks.

4. A multicast traffic read method in a switch, comprising:
    receiving a read request for a multicast traffic packet that is stored in an identified one of a plurality of shared memory banks that couple a plurality of ingress ports and a plurality of egress ports in said switch;
    determining whether said requested multicast traffic packet is stored in a cache memory that is associated with said identified one of said plurality of shared memory banks;
    reading said requested multicast traffic packet from said cache memory if it is determined that said requested multicast traffic packet is stored in said cache memory that is associated with said identified one of said plurality of shared memory banks; and
    if it is determined that said requested multicast traffic packet is not stored in said cache memory that is associated with said identified one of said plurality of shared memory banks, then reading said requested multicast traffic packet from a main memory of said identified one of said plurality of shared memory banks.

5. The method of claim 4, wherein said determining comprises determining whether said requested multicast traffic packet is stored in a cache memory contained within said identified one of said plurality of shared memory banks.

6. The method of claim 5, wherein said determining comprises determining whether said requested multicast traffic packet is stored in a cache memory that is associated with a plurality of shared memory banks that include said identified one of said plurality of shared memory banks.

7. The method of claim 5, further comprising reading a requested unicast traffic packet from a main memory of said identified one of said plurality of shared memory banks at the same time that said requested multicast traffic packet is read from said cache memory.

8. A multicast traffic read method in a switch, comprising:
    receiving a read request for a multicast traffic packet that is stored in an identified one of a plurality of shared memory banks that couple a plurality of ingress ports and a plurality of egress ports in said switch;
    storing said read request for said multicast traffic packet in a request cache;
    counting additional read requests for said multicast traffic packet prior to a read event of said multicast traffic packet; and
    transferring said multicast traffic packet obtained through said read event to a plurality of egress ports that are represented by said additional read requests.

9. The method of claim 8, further comprising passing an identification of an egress port to a control element that controls said transferring.

* * * * *